United States Patent [19]

Privett

[11] Patent Number: 4,619,072

[45] Date of Patent: Oct. 28, 1986

[54] METHOD AND APPARATUS FOR IRRIGATING PLANTS

[76] Inventor: Eric B. Privett, P.O. Box 106, Honeydew 2040, South Africa

[21] Appl. No.: 647,935

[22] Filed: Sep. 6, 1984

[30] Foreign Application Priority Data

Sep. 9, 1983 [ZA] South Africa .................... 83/6699

[51] Int. Cl.⁴ .............................................. A01G 31/02
[52] U.S. Cl. .......................................... 47/59; 47/79;
137/209; 137/386; 137/453; 239/1; 239/70;
239/124; 239/373
[58] Field of Search ..................... 239/1, 71, 124, 373,
239/70; 137/209, 212, 386, 453; 47/59–64,
79–81

[56] References Cited

U.S. PATENT DOCUMENTS

| 711,162 | 10/1902 | Holbach | 137/212 |
| 2,278,991 | 4/1942 | Hasslacher et al. | 47/79 X |
| 2,306,027 | 12/1942 | Swaney | 47/79 |
| 2,648,164 | 8/1953 | Bruch | 47/79 |
| 4,016,677 | 4/1977 | Julinot | 47/64 |
| 4,056,899 | 11/1977 | Close | 47/79 |
| 4,057,930 | 11/1977 | Barham | 47/79 X |
| 4,057,933 | 11/1977 | Enyent | 47/79 |
| 4,235,829 | 11/1980 | Partus | 137/209 X |
| 4,447,983 | 5/1984 | Shimada | 47/79 X |

FOREIGN PATENT DOCUMENTS 534185  4/1921  France ........................ 239/373

Primary Examiner—Joseph F. Peters, Jr.
Assistant Examiner—Mary Beth O. Jones
Attorney, Agent, or Firm—Scully, Scott, Murphy & Presser

[57] ABSTRACT

A method and apparatus for irrigating plants in a controlled manner. The method includes the alternate steps of moving the irrigating liquid from a reservoir containing the liquid to a plant-accommodating container situated at a level higher than that of the reservoir by using pressurized air to displace the liquid from the reservoir, and then of terminating the flow of displacing air to permit excess liquid to return from the container to the reservoir under gravity. These alternate steps are carried out automatically in accordance with a predetermined cycle.

8 Claims, 3 Drawing Figures

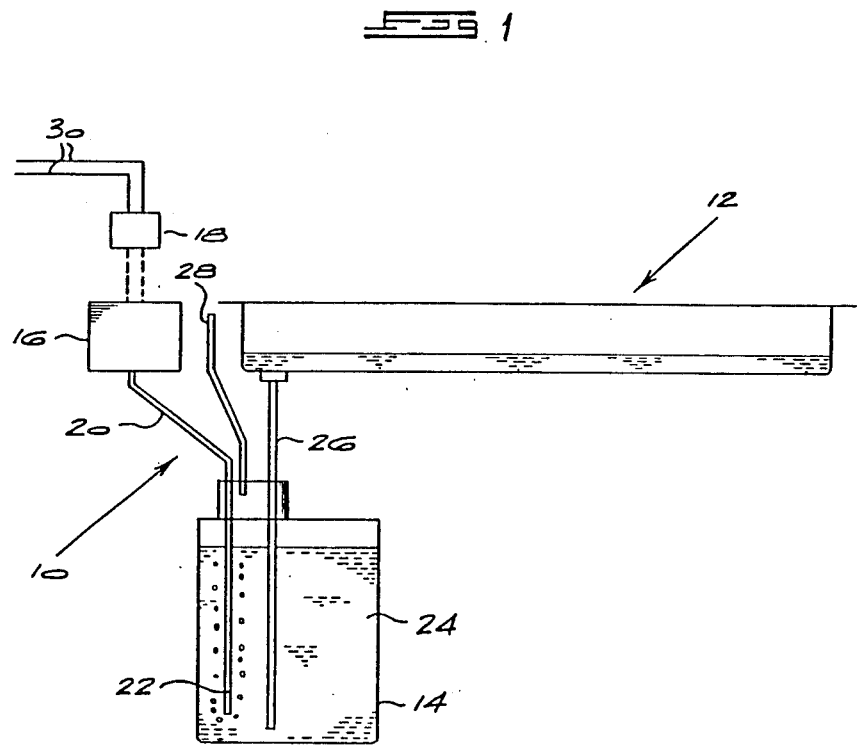

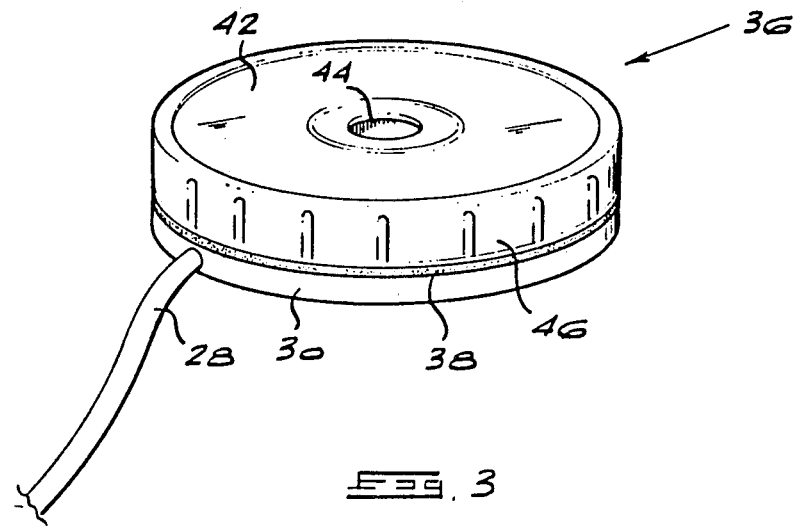
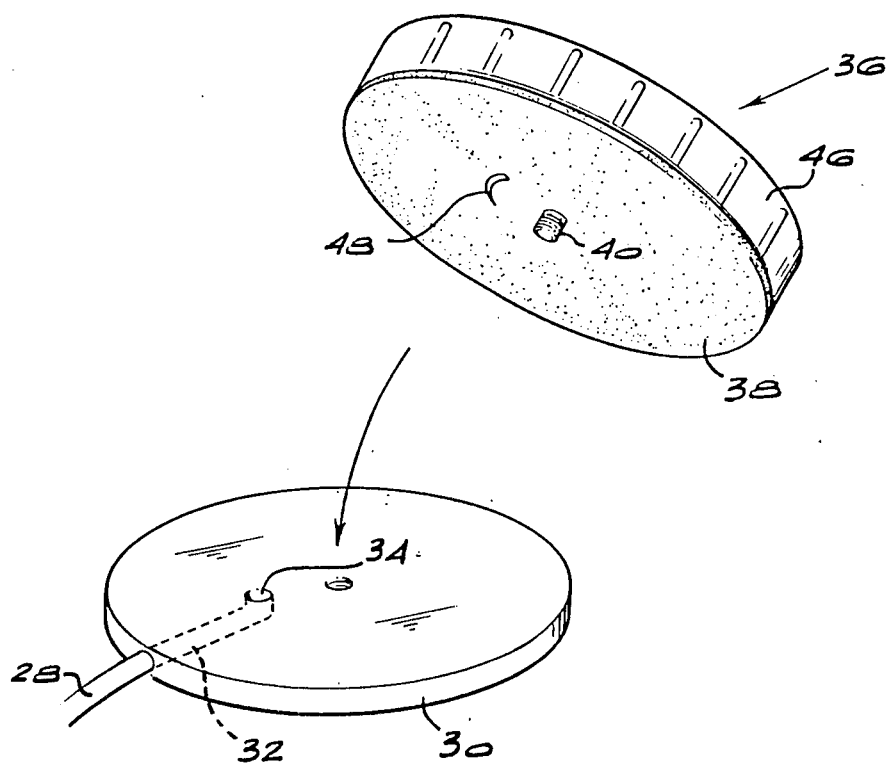

METHOD AND APPARATUS FOR IRRIGATING PLANTS

BACKGROUND OF THE INVENTION

This invention relates to an irrigation system for irrigating plants (including seedlings) in a controlled manner.

One system for this purpose, for small scale domestic use, is described in the specification of U.S. Pat. No. 4,475,307. In this system, there is a pivotally mounted reservoir for the liquid which is to be supplied to the plants. When swung about its axis to a first position, the reservoir is elevated with respect to a container accommodating the plants and the liquid is able to flow under gravity from the reservoir to the container. When a predetermined amount of liquid has been dispensed to the container, a counterweight urges the reservoir to swing back about the pivotal axis to a second position in which it is at a lower level than the container. Excess liquid now flows under gravity from the container to the reservoir for re-use when the reservoir is moved to its first position again.

While this system has proved successful in many applications, the fact remains that it is necessary to move the reservoir by hand each time a new irrigation cycle is to be commenced.

There are a number of features which a domestic irrigation system for the irrigation of plants should have in order to operate successfully. For instance, the periods and duration of irrigation cycles should be readily adjustable; the system should be capable of automatic operation, requiring little attention; excess irrigating liquid which is not consumed by the plants during each cycle should be capable of returning to a storage vessel for future use, thus reducing wastage and ensuring that there is sufficient irrigating liquid available for extended use; there should be means for ensuring a constant, predetermined level of liquid in the container in which the plants are situated; and the equipment should be safe, even when used outdoors. The last requirement is a particularly important one where the system makes use of electricity, since it is dangerous to have electrical components operating in the vicinity of liquids. Another important requirement of an efficient irrigation system is the capability to aerate the irrigating liquid prior to its being fed to the plants, since this leads to more efficient growth of the plants.

A number of different irrigation systems are shown in the prior art. In a number of prior art systems, the irrigating liquid is moved from a low level liquid vessel to a higher container accommodating the plants. In some cases, this is achieved with the use of a wicking material and capillary action. See, for example, UK patent application No. 2 113 963 A (Harris) and UK Pat. No. 1374647 (Sweetnburgh and Geyelin). Others make use of overhead sprays, which are, however, not suitable for irrigation in many cases. See, for example, U.S. Pat. No. 2,855,725 (Carothers). Others make use of conventional pumping arrangements, often automatically timed and controlled. See, for example, German Pat. No. 25 55 686 (Zink). Others make use of a gravity flow. See, for example UK patent application No. 2 009 574. Still others achieve aeration of the irrigating liquid. See, for example, U.S. Pat. No. 4,057,933 (Enyeart).

The present invention seeks to provide an irrigation system suitable for domestic use and which, at least in some embodiments, exhibits the advantageous features listed above.

SUMMARY OF THE INVENTION

According to one aspect of a system of this invention, a method of irrigating plants in a controlled manner includes the alternate steps of moving liquid from a reservoir containing the liquid to a container accommodating the plants and situated higher than the reservoir by introducing a flow of air under pressure into the reservoir to displace liquid from the reservoir to the container and aerate the liquid which is displaced, and of terminating the flow of air into the reservoir to permit excess liquid to return from the container to the reservoir under gravity, and the further step of regulating the introduction and termination of the air flow in accordance with a predetermined cycle.

According to another aspect of the system, an apparatus for use in irrigating plants in a controlled manner includes a reservoir for containing liquid and for location at a level lower than that of a container accommodating the plants, air supply means operable to force a flow of air under pressure into the reservoir to drive or carry liquid from the reservoir to the container and aerate it, and regulating means periodically for terminating the operation of the air supply means in accordance with a predetermined cycle to permit excess liquid to return to the reservoir from the container under gravity.

Conveniently, the air supply means includes an electrically powered air pump and an air supply conduit for conveying compressed air from the pump and venting it at a submerged level in the reservoir, and the regulating means comprises a timer switching unit for alternately causing and terminating operation of the pump in accordance with the predetermined cycle.

The timer switching unit is preferably adjustable so that the duration of pump operation, and the time lapses between successive pumping operations, can be varied to suit the particular requirements.

BRIEF DESCRIPTION OF THE DRAWINGS

FIG. 1 shows a schematic view of an irrigation system according to this invention;

FIG. 2 shows an assembled view of a simple device for providing a variable aperture nozzle at the end of the tube 28 in FIG. 1; and FIG. 3 shows an exploded view of the FIG. 2 device.

DESCRIPTION OF PREFERRED EMBODIMENTS

The numeral 10 in FIG. 1 designates generally an apparatus of a first embodiment of the invention, and the numeral 12 a container for plants (including seedlings). The container 12 is of the same type as that described in the specification of South African Pat. No. 82/6288, the disclosure of which is incorporated by reference.

The apparatus 10 includes a reservoir 14, a small air pump 16 and an automatic timer switching unit 18. An air supply conduit 20 extends from the pump 16 to the interior of the reservoir 14 and vents at a level 22 near the bottom of the reservoir below the surface of a volume of liquid 24 in the reservoir. Generally, the liquid 24 will be pure water or a water-based solution including nutrients appropriate for the type of plants in the container 12. Another conduit 26 extends upwardly from below the level of the liquid in the reservoir to the container 12. A slender vent tube 28 extends upwardly from the reservoir to vent to the atmosphere.

Electrical power for the pump 16 and the unit 18 is conducted by cables 30. The unit 18 is set to actuate the pump 16 intermittently in accordance with a predetermined cycle. When the pump is operational, pressurised air is pumped through the conduit 20 into the reservoir 14, where it bubbles up through the liquid and accumulates in the upper part of the reservoir, displacing liquid from the reservoir through the conduit 26 into the container 12. Some of the air which arrives in the reservoir is entrained by the liquid, with the advantageous result that the liquid supplied to the container is aerated to some extent. The degree of aeration can be increased by fitting a conventional bubbler head 21 to the end of the conduit 20.

When the timer unit switches off the pump 16 in accordance with the predetermined setting of the unit, that excess liquid in the container 12 which has not been consumed is able to drain back into the reservoir under gravity. Since the contents of the reservoir are still under pressure, a pressure relief is necessary, and this is provided by the vent tube 28, which permits air in the upper part of the reservoir to bleed to atmosphere. The tube 28 can be fitted at its end with a variable aperture nozzle for controlling the rate at which the air is bled off.

If the head through which liquid has to be lifted from the reservoir to the container is kept reasonably low, it will be appreciated that the pump 16 need not have a high rating, and the apparatus is therefore economical. The inventor has successfully employed a small pump of the type commonly used to aerate small aquariums.

Further advantages offered by the invention, and which would not be offered by a system in which a water pump were used to elevate the liquid to the container are the fact that the liquid supply to the container is aerated which contributes greatly to successful plant growth, and the fact that it is possible to situate the electrical components (i.e. the pump 16, timer unit 18 and cables 30) well away from the container 12. Often, the container 12 will be situated in a location exposed to the weather, such as on a porch. It would be extremely dangerous to have electrical components exposed to the elements, but with the present invention it is possible to situate these components indoors, or at least under adequate cover. The components which are exposed to the weather do not present any electrical dangers.

The volume of the reservoir 14 will usually be chosen to be less than that of the container 12 so there is no danger of the container overflowing if the timer unit should fail for any reason, and the pump 16 should continue to operate. Even with this safety feature, it is advantageous to be able to control the level of the liquid in the reservoir with some degree of accuracy for efficient plant growth.

The invention contemplates the provision of means to achieve efficient level control in the container 12. There may, for instance, be a float-controlled switch for terminating operation of the pump 15 on attainment of the desired level in the container.

One particularly simple and preferred device for this purpose is shown in FIG. 2 and 3. The device serves as a variable aperture nozzle for the end of the tube 28. As pressurised air is fed to the reservoir 14 by the pump 16, some of it escapes through the tube 28. By controlling the rate of venting through the tube 28 i.e. controlling the pressure of the air and hence the head through which liquid can be lifted from the reservoir during pumping, level control in the container can be achieved.

The end of the tube 28 is fixed to a circular plate 30 and communicates with a right-angled passage 32 in the plate. The passage 32 vents at an aperture 34 in the upper surface of the plate slightly offset from the centre of the plate. A lid 36 having a flat base 38 is fitted to the upper surface of the plate 28, the lid 36 and plate 28 being rotatable relative to one another about a central pin in the form of a screw 40 passing through the base 38 into the plate. The lid has a hollow interior with an upper surface 42 which is holed at 44 and a side wall 46, the lower edge of which supports the base 38.

A triangular slot 48 is formed in the base 38 a short distance from the centre. When the lid is rotated relative to the base, the slot aligns with the aperture 34. Because of its triangular shape, varying areas of the slot can be arranged to coincide with the aperture 34 i.e. by rotating the lid, one can vary the outlet area available for air to escape through the tube 28, and hence control the level of liquid in the container 12 within close limits.

The variable aperture facility also permits control over the rate at which unconsumed liquid returns from the container 12.

Of course, the variable aperture nozzle can be provided in many ways different from that seen in FIGS. 2 and 3. In each case, it is obviously advantageous to be able to set the aperture with a reasonable degree of accuracy, so that accurate control can be maintained over the level of liquid in the reservoir. In this way, the requirements of different plants can be catered for accurately. With the variable aperture nozzle seen in FIGS. 2 and 3, this can be achieved in a very simple manner merely by providing a pointer on the side wall 46 of the lid 36 and a series of graduations on the plate 30, the correct positioning of the lid with respect to the plate then being determined by correct alignment of the pointer with the desired graduation.

It will also be appreciated that the adjustable timer unit 18 enables strict control to be maintained over the duration of each irrigating cycle and the time lapses between successive cycles.

I claim:

1. A method of irrigating plants in a controlled manner including the steps of moving liquid from a reservoir to a container accommodating the plants and situated a predetermined distance above the reservoir by introducing a flow of air under pressure into the reservoir through an air supply conduit extending into the reservoir to a level beneath the surface of the liquid therein and near to the bottom of the reservoir to displace liquid from the reservoir to the container and to aerate the liquid which is so displaced, constantly venting air to atmosphere from above the liquid in the reservoir through a vent controlled by a variable aperture nozzle, limiting the liquid level in the container at a desired level for efficient plant growth by an appropriate setting of the variable aperture nozzle, periodically terminating the flow of air into the reservoir to permit excess liquid to return from the container to the reservoir under gravity while permitting air to evacuate from the reservoir to atmosphere through the vent and regulating the introduction and termination of the air flow in accordance with a predetermined cycle.

2. The method of claim 1 and including the steps of pumping air into the reservoir with an electric air pump and of using an adjustable timer unit to control the duration of operation of the pump and the time lapses between successive operations of the pump.

3. The method of claim 1, and including the step of pumping air into the reservoir through a bubbler head situated beneath the surface of the liquid in the reservoir.

4. The method of claim 2, and including the step of situating the pump and timer unit in a position remote from the reservoir and container.

5. An apparatus for irrigating plants in a controlled manner including a reservoir for containing irrigating liquid and for location at a predetermined level below that of a container which accommodates plants which are to be irrigated, a vent which includes a variable aperture nozzle and which provides continuous communication between an air space above the liquid in the reservoir and the atmosphere, air supply means operable to supply a flow of pressurized air, an air supply conduit extending from the air supply means and into the reservoir where it vents at a position beneath the surface of the liquid therein and near the bottom thereof, the air supply conduit serving to convey pressurized air into the reservoir to displace liquid from the reservoir to the container, the displaced liquid being aerated by virtue of the fact that the air vents into the reservoir beneath the surface of liquid therein and near the bottom thereof and bubbles up through the liquid, level control means for limiting the liquid level in the container at a desired level for efficient plant growth, said control means being constituted by a combination of the variable aperture nozzle in the vent and the air supply conduit which vents beneath the surface of the liquid in the reservoir, and regulating means periodically for terminating the operation of the air supply means in accordance with a predetermined cycle to permit excess liquid to return to the reservoir from the container under gravity, the vent serving to permit escape of air from the reservoir to atmosphere both during displacement of liquid from the reservoir to the container and during return of liquid from the container to the reservoir, and to control the rate of such return flow.

6. The apparatus of claim 5, in which the air supply means is in the form of an electric air pump, and the regulating means for periodically terminating the operation of the pump is an adjustable timing unit controlling the pump.

7. The apparatus of claim 6, and including a bubble head fitted to the end of the air supply conduit which vents beneath the surface of the liquid in the reservoir.

8. The apparatus of claim 6, in which the air supply conduit is of sufficient length to enable the air pump and timer unit to be situated in a position so remote from the reservoir and container that there is no danger of the liquid contacting the pump or timer unit.

* * * * *